United States Patent [19]
Brekke

[11] 3,782,553
[45] Jan. 1, 1974

[54] LIGHT LIQUID SKIMMER
[76] Inventor: Carroll E. Brekke, 2229 Parkland Way, Petaluma, Calif. 92952
[22] Filed: May 3, 1972
[21] Appl. No.: 249,863

[52] U.S. Cl............................ 210/242, 210/DIG. 21
[51] Int. Cl.............................................. E02b 15/04
[58] Field of Search............... 210/83, 242, DIG. 21, 210/65, 172

[56] References Cited
UNITED STATES PATENTS
3,303,932  2/1967  Hirs et al. ........................... 210/242
3,635,342  1/1972  Mourlon et al. .................... 210/242

Primary Examiner—Samih N. Zaharna
Assistant Examiner—T. A. Granger
Attorney—Hubert E. Dubb et al.

[57] ABSTRACT

A light liquid skimmer employs an air seal piston having skim slots on the upper end thereof and a flow through vessel, said piston being moveable with respect to said vessel, to skim a light liquid from a heavy liquid. The position of the skim slots moves upwardly or downwardly as the proportion of light liquid decreases or increases, respectively. The adjustment is accomplished by the movement of the air seal piston with respect to the flow through vessel due to the adjustment in buoyancy of the air seal piston as the weight of the liquid in the flow through vessel varies and thereby changes the configuration of the air seal between the air seal piston and flow through vessel. Skimmed liquid flows downwardly through intake conduits within the air seal piston and flow through vessel and is introduced to the mixture of liquid within the flow through vessel in the lower region thereof. The light liquid rises within said flow through vessel and is recovered through light liquid recovery slots configured in a light liquid recovery tube positioned within the vessel. The heavy liquid continues to flow downwardly and is discharged through a heavy liquid discharge orifice at the bottom of the flow through vessel.

7 Claims, 3 Drawing Figures

PATENTED JAN 1 1974　　3,782,553

LIGHT LIQUID SKIMMER

BACKGROUND OF THE INVENTION

This invention relates to a device for separating liquids having different specific gravities, and more particularly, relates to an oil skimmer for skimming undesirable oil from water.

The pollution problems resulting from the production, transportation, and refining of crude oil and the distribution of refinery products have received widespread attention. The principal problem is the spillage of crude oil during transportation and refinery products during distribution. This most often occurs in open waterways since water transportation is the most economical way to transport oil. The problem is pervasive since the oil floats on the water and quickly becomes distributed over a large area and washes up on beaches or comes in contact with ships and wildlife.

Oil is a byproduct of many factory processes and therefore is a component of the liquid waste effluent from many factories. This effluent, although treated, eventually is discharged into open waterways where it floats on the surface since it has a lower specific gravity than water. The residual oil in this effluent, in the aggregate, poses a serious pollution problem.

In the refining of crude oil and in the preparation of specialized oil products it is often necessary to separate grades of oil having different specific gravities. This separation is often carried out by the employment of successive fractionating stacks to take out the oil having a lower specific gravity. These stacks are bulky and therefore expensive and do not accomplish precise separation unless employed in sequence.

For these reasons it is highly desirable to be able to effectively and efficiently separate residual oil from open water or from streams of flowing water or to separate oils having differing specific gravities, in other woeds, it is highly desirable to separate a minor amount of a liquid having a lower specific gravity (a light liquid) from a major amount of a liquid having a higher specific gravity (a heavy liquid).

Numerous methods for skimming oil from water have been devised. Complex pumping systems which force the oil and water through wier systems and rely upon vortex action and centrifugal force to separate the oil and water have been used. Such systems, however, are expensive and subject to mechanical breakdown. Forced coalescence entails the forcing of the oil and water through a series of channels having internal screens so that smaller oil droplets are forced to coalesce together and are then separated out. Gravity separation is often used but is limited by the fact that slow flow rates are necessary to the practice of this principle. The widely adopted API (American Petroleum Institute) separator utilizes the gravity separation principal. A basin, typically four to eight feet deep, has a flow of liquid running from one end to the other. The oil globules must rise to the top during transit through the separator so that the oil can be diverted to a separate stream. One variation of this gravity separation principal is the CPI separator (corregated plate interceptor) which positions an array of inclined parallel plates within a separator unit to allow oil globules to rise and separate more quickly into a distinct stream. Miscellaneous techniques include soaking up oil with straw, chemically breaking up the oil molecules, and herding the oil slick into a combined confined space so that the oil can be pumped in bulk to a large storage tank for subsequent disposal. None of these approaches is suitable for effective and efficient open water oil skimming.

It is therefore an object of this invention to provide a durable and effective oil-water skimmer which can be placed in position in a flowing stream of water and oil or can be moved through a stagnant pool or open body of water and oil.

It is a further object of this invention to provide an oil-water skimmer which will accommodate streams of water-oil flow which have varying proportions of water and oil.

It is an additional object of this invention to provide a water-oil skimmer which does not significantly interfere with the normal flow of a waste water stream.

It is a still further object of this invention to provide a light liquid skimmer which will accommodate immisable liquids having different specific gravities, i.e., will skim a minor amount of a light liquid from a major amount of a heavy liquid.

DESCRIPTION OF THE PREFERRED EMBODIMENT

Figure 1:
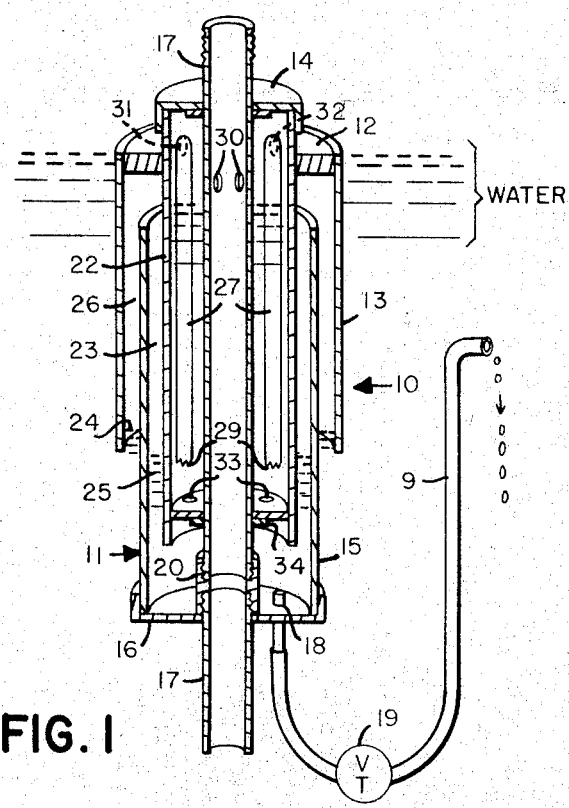
FIG. 1 is a cross sectional view of the oil skimmer of the present invention in a flowing stream of water.

For a detailed understanding of the operation of the oil skimmer of the present invention reference may now be had to FIG. 1 in which flow through vessel 11 is shown to be affixed to oil recovery pipe 17 by means of threaded connection 20. Flow through vessel 11 consists of cylindrical wall 15 and bottom plate 16. Cylindrical wall 15 of flow through vessel 11 is shown to reside intermediate inner wall 22 and outer wall 13 of air seal piston 10. Air seal piston 10 is shown to consist of centering cap 14, shoulder 12, inner wall 22, outer wall 13 and centering guide 34.

In the mode of operation illustrated in FIG. 1 no oil is encountered so skim slots 31 and 32 rest approximately at the surface of the volume of liquid (shown to be water). Surface liquid sampling is introduced to the interior of flow through vessel 11 by skim slots 31 and 32. The rate of surface liquid sampling is determined in this mode by the setting of the surface sampling throttle valve 19. An interior air column 23 and an exterior air column 26 of approximately equal height are located between cylindrical wall 15 of flow through vessel 11 and inner wall 22 and other wall 13, respectively, of air seal piston 10. Internal liquid column 25 and external liquid column 24 are located underneath air columns 23 and 26, respectively, as shown. It is evident that internal liquid column 25 is in communication with the liquid in flow through vessel 11 and air seal piston 10 and that external liquid column 24 is in communication with the liquid in the flowing stream.

Figure 2:
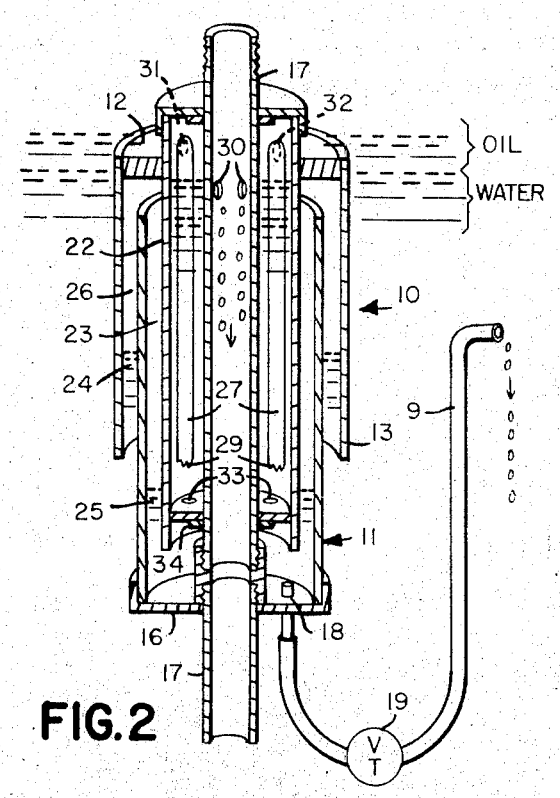
FIG. 2 is a cross sectional view of the oil skimmer of the present invention when a thin film of oil is encountered on the surface of a volume of water.
Figure 3:
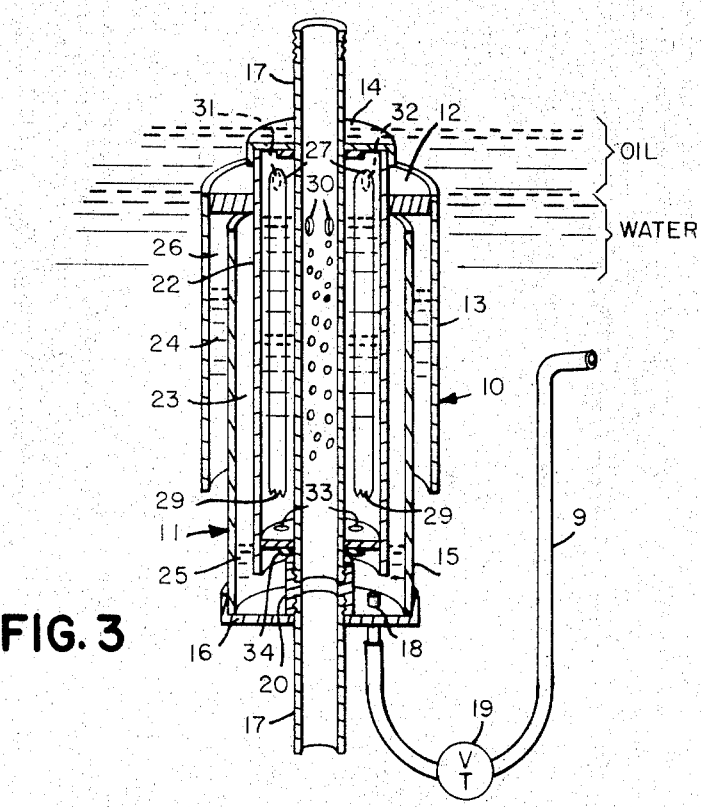
FIG. 3 is a cross sectional view of the oil skimmer of the present invention when a thick film of oil is encountered on a volume of water.

As oil is encountered on the surface of the flowing stream, and enters through skim slots 31 and 32, equilibrium between the afore-mentioned liquid columns 24 and 25 will be disturbed. To compensate for this equilibrium disturbance liquid column 25 will drop. When liquid column 25 drops, liquid column 24 will simultaneously rise. Both liquid columns 24 and 25 move in unified precision to reestablish a new equilibrium. The net result of the newly established equilibrium is a lesser buoyancy for air seal piston 10. The net result of a lesser buoyancy for air seal piston 10 is a lowering of skim slots 31 and 32. The ultimate result of the lowering of skim slots 31 and 32 is the precise positioning of skim slots 31 and 32 at the oil-water interface so that maximum skimming of the desired lighter floating surface liquid is obtained and maintained. For clarity of discussion three discrete modes of operation are illustrated in FIGS. 1, 2, and 3. However, the adjustments are continuous in actual operation to the effect that skim slots 31 and 32 locate and lock on to the oil-water interface.

The liquid skimmed through skim slots 31 and 32 travels downwardly through intake conduits 27 which have a jagged edge 29 at their bottom end. The skimmed liquid is then discharged near the bottom of inner wall 22 of air seal piston 10. The intake conduits 27 are desirable for at least three reasons: (1) the momentum of the skimmed liquid would carry some of the heavy liquid directly to light liquid recovery slots 30; (2) the passage of the heavy liquid through the light liquid could create an emulsification and (3) droplets of heavy liquid could float on the surface of the light liquid due to the surface tension of the light liquid.

After discharge from the jagged bottom ends 29 of intake conduits 27 the light liquid (shown to be oil) will rise within the air seal piston 10 due to its lesser specific gravity and will be recovered through light liquid recovery slots 30 shown to be positioned near the upper end of light liquid recovery tube 17. The recovered light liquid (shown to be oil) will then flow downwardly by gravity flow through light liquid recovery tube 17 and can then be transported to a remote storage area. The heavy liquid (shown to be water) will continue to move downwardly by gravity flow after discharge from jagged bottom ends 29 of intake conduits 27 and will pass through holes 33 in centering guide 34 and will be discharged through heavy liquid discharge orifice 18 and thence through discharge tubing 9 to the flowing stream. It should be noted that the height of the open end of discharge tubing 9 should not be allowed to be greater than the height of skim slots 31 and 32 since no liquid would be accepted by air seal piston 10 and flow through vessel 11 if the backup pressure within the vessel were greater than the force of the flowing stream.

The buoyancy range of air seal piston 10 can be adjusted to permit operation for liquids having varying specific gravities. This adjustment may be made by fabricating air seal piston 10 from lighter or heavier materials or by controlling the initial amount of air included in air columns 23 and 26. The adjustments in buoyancy range permit, for example, operation when oil is skimmed from water or when lightweight oil is skimmed from heavy crude oil fractions.

FIG. 3 illustrates the operation of the oil skimmer when a thicker film of light liquid (shown to be oil) is encountered. Air seal piston 10 has moved downwardly still further with respect to flow through vessel 11. The position of air columns 23 and 26 has shifted still further to permit a further equilibrium adjustment. External liquid column 24 has risen further between outer wall 13 of air seal piston 10 and wall 15 of flow through vessel 11. The height of interior liquid column 25 has been reduced still further in the space between inner wall 22 of air seal piston 10 and wall 15 of flow through vessel 11. A significant volume of light liquid (shown to be oil) has collected in the upper end of air seal piston 10 and flow through vessel 11 and a maximum rate of oil flow is reached through light liquid recovery slots 30. In this mode of operation it is essential that the jagged bottom ends 29 of intake conduits 27 be positioned below the lower interface of the light liquid since the travel of heavy liquid through the light liquid could create an undesirable emulsion.

Since there is not direct contact between flow through vessel 11 and air seal piston 10 an almost frictionless operation is achieved so that minor adjustments in the position of air seal piston 10 are possible when varying amounts of light and heavy liquid are encountered.

In operation it is contemplated that the oil skimmer will be affixed permanently to a floating or stationary structure and will not require intensive maintenance. As long as the size and shape of the air seal piston is designed to accommodate the types of light and heavy liquids to be encountered the oil skimmer will operate troublefree. In one embodiment a series of readily removable air seal pistons sleeves are used in conjunction with a single flow through vessel. If the constituents of the flowing stream are changed or if the proportion of light and heavy liquid changes greatly a different air seal piston can be placed over the stationary flow through vessel.

The cardinal aim of the present invention is to efficiently skim a light liquid from a heavy liquid. To effect this end generation of emulsification within the skimmer must be prevented. As stated supra intake conduit 27 prevents emulsification due to the passage of heavy liquid through a layer of light liquid. Within intake conduit 27 there is a mixing of liquids and some droplets of heavy liquid form which have thin skins of light liquid on their surface. These droplets would tend to collect near the bottom plate 16 of flow through vessel 11 if they were not broken up. It has been found that jagged edges (shown as jagged edges 29) on the bottom of intake conduit 27 will break up most of these droplets.

While specific embodiments of the light liquid skimmer of the present invention have been illustrated in the drawing and described in the specification, the invention is intended to be limited only by the scope and spirit of the appended claims.

I claim:

1. A skimming device for separating a minor amount of a first light liquid from a major amount of a second heavy liquid, comprising:

a flow through vessel having a heavy liquid discharge orifice at the bottom thereof and having an opening for a light liquid recovery tube at the bottom thereof, the side of said vessel forming an open rim at the upper end thereof;

an air seal piston disposed to fit over the open rim of said flow through vessel and disposed to move vertically with respect thereto, said air seal piston having skim slots at the upper end thereof to receive a liquid cut and introduce said liquid cut to said flow through vessel, said air seal piston being divided below the position of said skim slots to form an inner and outer wall disposed in spaced apart relationship so that when said air seal piston is placed over said flow through vessel said outer wall is positioned exteriorly of said flow through vessel and said inner wall is positioned interiorly of said flow through vessel, the space between said flow through vessel and said outer wall containing an air column with an external liquid column underneath, said external liquid column being in communication with an external volume of liquid, the space between said flow through vessel and said inner wall containing an air column with an internal liquid column underneath, said internal liquid column being in communication with said liquid in said flow through vessel, said air columns above said external and internal liquid columns being in communication to form a single variable position air column to permit equilibrium adjustments in the heights of said external and internal liquid columns as said air seal piston moves with respect to said flow through vessel in response to varying proportions of said light and heavy liquids; and a light liquid recovery tube positioned within said flow through vessel and spanning at least substantially the length of said flow through vessel and extending through said opening for a light liquid recovery tube at the bottom of said vessel, said tube having a light liquid recovery opening at or near the upper end thereof to receive the light liquid whch floats upwardly by gravity flow against the downward flow of said heavy liquid within said flow through vessel.

2. The light liquid skimming device of claim 1 wherein said light liquid recovery opening comprises a plurality of light liquid recovery slots.

3. The light liquid skimming device of claim 1 wherein skimmed liquid intake conduits are positioned interiorally of said inner wall of said air seal piston adjacent each of said skim slots to direct the flow of skimmed liquid downwardly so that said skimmed liquid is introduced to the liquid mixture within said air seal piston and flow through vessel below the interface between the volumes of light and heavy liquids to prevent emulsification.

4. The light liquid skimming device of claim 3 wherein the bottom ends of said conduits are configured in a jagged saw tooth shape to break up surface films of said light liquid formed on individual droplets of said heavy liquid.

5. The light liquid skimming device of claim 4 wherein a heavy liquid discharge tube is attached externally of said heavy liquid discharge orifice, said heavy liquid discharge tube having a throttle value affixed along its length to permit control over the skimmed liquid intake rate, the height of the terminal end of said heavy liquid discharge tube being lower than the level of said skim slots.

6. The light liquid skimming device of claim 3 wherein said flow through vessel, said air seal piston including said inner and outer walls, and said light liquid recovery tube are cylindrically shaped and are positioned in coaxial alignment, said air seal piston being held in spaced apart relationship from said flow through vessel by a flat centering guide attached to said inner wall and adapted to ride freely along said light liquid recovery tube.

7. The light liquid skimming device of claim 6 wherein the range of buoyancy of said air seal piston is chosen to permit oil having a specific gravity of about 0.65 to about 0.95 to be skimmed from water.

* * * * *